(12) United States Patent
Schalli et al.

(10) Patent No.: US 9,493,128 B2
(45) Date of Patent: Nov. 15, 2016

(54) METHOD FOR OPERATING AN ON-BOARD POWER SUPPLY SYSTEM OF A MOTOR VEHICLE

(75) Inventors: Niklas Schalli, München (DE); Holger Haecker, Waidhofen (DE)

(73) Assignee: AUDI AG, Ingolstadt (DE)

( * ) Notice: Subject to any disclaimer, the term of this patent is extended or adjusted under 35 U.S.C. 154(b) by 796 days.

(21) Appl. No.: 13/979,349

(22) PCT Filed: Dec. 16, 2011

(86) PCT No.: PCT/EP2011/006368
§ 371 (c)(1),
(2), (4) Date: Oct. 30, 2013

(87) PCT Pub. No.: WO2012/095145
PCT Pub. Date: Jul. 19, 2012

(65) Prior Publication Data
US 2014/0346858 A1    Nov. 27, 2014

(30) Foreign Application Priority Data
Jan. 12, 2011 (DE) .......................... 10 2011 008 376

(51) Int. Cl.
*B60R 16/033* (2006.01)
*B60L 11/18* (2006.01)
*B60L 1/02* (2006.01)

(52) U.S. Cl.
CPC ................ *B60R 16/033* (2013.01); *B60L 1/02* (2013.01); *B60L 11/1809* (2013.01);
(Continued)

(58) Field of Classification Search
CPC .... B60R 16/003; B60L 1/02; B60L 11/1868; Y02T 10/7005; Y02T 10/7066
See application file for complete search history.

(56) References Cited

U.S. PATENT DOCUMENTS 6,949,841 B1   9/2005  Cailleux
7,911,078 B2*  3/2011  Kobayashi .......... B60L 11/1868
                                                    307/10.6

(Continued)

FOREIGN PATENT DOCUMENTS

DE     195 34 174      3/1997
DE     102005002401    8/2006
(Continued)

OTHER PUBLICATIONS

Chinese Search Report issued by the Chinese Patent Office in Chinese Application Nr. 2011800648841 on Feb. 2, 2015.
(Continued)

*Primary Examiner* — Rexford Barnie
*Assistant Examiner* — Terrence Willoughby
(74) *Attorney, Agent, or Firm* — Henry M. Feiereisen LLC.

(57) ABSTRACT

A method for operating an onboard power supply system of a motor vehicle, wherein the onboard power supply system includes at least two electric networks with different supply voltages. A network component, in particular an electrical load, is connected to each network, and a high-voltage battery is connected to the high-voltage network. A specified amount of power is supplied from the high-voltage network to a low-voltage network, wherein the supply voltage of the low-voltage network is lower than the supply voltage of the high-voltage network. Power of at least one network component connected in the low-voltage network is reduced when a power shortfall occurs in the high-voltage network while the high-voltage battery is being charged. The amount of power supplied by the high-voltage network to the network component in the low-voltage network is also reduced.

8 Claims, 1 Drawing Sheet

(52) U.S. Cl.
CPC ..... *B60L 11/1868* (2013.01); *B60L 2240/547* (2013.01); *B60L 2240/549* (2013.01); *Y02T 10/7005* (2013.01); *Y02T 10/7066* (2013.01)

(56) References Cited

U.S. PATENT DOCUMENTS

| | | | | |
|---|---|---|---|---|
| 2006/0103359 A1* | 5/2006 | Watanabe | ........... | H02M 3/1582 323/225 |
| 2007/0152640 A1* | 7/2007 | Sasaki | ................ | B60H 1/00278 320/150 |
| 2009/0130538 A1* | 5/2009 | Kaita | ................. | G01R 31/3675 429/50 |

FOREIGN PATENT DOCUMENTS

| | | |
|---|---|---|
| DE | 102005026866 | 12/2006 |
| DE | 600 33 861 | 11/2007 |
| DE | 102006026404 | 12/2007 |
| DE | 102008010097 | 8/2009 |
| EP | 2 255 990 | 12/2010 |
| JP | 2010-195065 | 9/2010 |
| JP | 2010-213556 | 9/2010 |
| JP | 2010-279159 | 12/2010 |
| WO | WO 2007/096720 | 8/2007 |

OTHER PUBLICATIONS

English translation of Chinese Search Report issued by the Chinese Patent Office in Chinese Application Nr. 2011800648841 on Feb. 2, 2015.

International Search Report issued by the European Patent Office in International Application PCT/EP2011/006368 on Apr. 25, 2013.

* cited by examiner

METHOD FOR OPERATING AN ON-BOARD POWER SUPPLY SYSTEM OF A MOTOR VEHICLE

CROSS-REFERENCES TO RELATED APPLICATIONS

This application is the U.S. National Stage of International Application No. PCT/EP2011/006368, filed Dec. 16, 2011, which designated the United States and has been published as International Publication No. WO 2012/095145 A2 and which claims the priority of German Patent Application, Serial No. 10 2011 008 376.6, filed Jan. 12, 2011, pursuant to 35 U.S.C. 119(a)-(d).

BACKGROUND OF THE INVENTION

The invention relates to a method for operating an onboard power supply system of a motor vehicle, wherein the onboard power supply system has at least two electrical networks with different supply voltages, wherein a high-voltage network for supplying power to at least one low-voltage network supplies a specified amount of power to the at least one low-voltage network at a lower supply voltage compared to the supply voltage of the high-voltage network, wherein at least one network component, especially an electrical load, is connected to each onboard power supply system and the high-voltage network has at least one high-voltage battery connected to the high-voltage network.

Motor vehicles, especially electric motor vehicles having an electric drive, with an onboard power supply system having two or more parallel electric networks, are known, with the networks having different voltages. For example, a high-voltage network, to which for example a drive unit is connected, has a supply voltage of 72 V and a low-voltage network, to which electrical loads, such as different entertainment or information devices for the vehicle occupants or the like are connected, have an AC voltage of 12 V. Basically, the high-voltage network or the at least one low-voltage network supplies, especially also when the high-voltage battery of the high-voltage network is being charged, respective electrical loads with a certain amount of electrical power to operate the network components connected on the low-voltage network, or the amount of power supplied to the low-voltage network via the high-voltage network side also charges a low-voltage battery connected on the low-voltage network side.

In conventional methods for operating an onboard power supply system, a power shortfall or a power shortage may occur in the high-voltage network during charging of the high-voltage battery. This is caused, in particular, by the amount of power supplied to the low-voltage network and/or by the power consumption of the network components connected in the low-voltage network. Specifically, for example, the high-voltage battery in the high-voltage network may overheat while being charged, because a cooling unit cooling the high-voltage battery during the charging process may not receive sufficient electrical power.

SUMMARY OF THE INVENTION

The invention therefore attempts to solve the problem of providing an improved method for operating an onboard power supply system.

The problem is solved with the invention by a method of the aforementioned type, which is characterized in that during a power shortfall occurring in the high-voltage network while charging the high-voltage battery, the power supplied to at least one of the at least one network component connected in the at least one low-voltage network and the amount of power supplied by the high-voltage network to the at least one low-voltage network of the at least one of the at least one network component is reduced.

According to the method according to the invention, the actual power requirement in the high-voltage network is therefore always determined at least while charging the high-voltage battery and compared with the total amount of power available on the high-voltage network side in form of a power balance. To determine the actual power demand in the high-voltage network, the power required for operating all network components connected on the high-voltage network side and the determined amount of power to be delivered to the at least one low-voltage network is considered. When the power demand from the high-voltage network side exceeds the total amount of power available in the high-voltage network, a power deficiency or a power shortfall exists on the high-voltage supply system. To compensate for the power shortfall, the power to at least one network component connected in the at least one low-voltage network is reduced so that the power demand of the low-voltage network caused by the at least one low-voltage network-side component is reduced. The amount of power supplied by the high-voltage network to the low-voltage network is also reduced commensurately. In extreme cases, the at least one network component connected to the low-voltage network is completely switched off, or electric power is no longer supplied by the high-voltage network to the low-voltage network. The portion of electric power that is now no longer supplied to the low-voltage network can then be used to operate one or more network components connected in the high-voltage network.

It is also possible to at least partially reduce the amount of power of the at least one network component connected in the at least one low-voltage network and the amount of power supplied from the high-voltage network to the at least one low-voltage network already at the point when the actual power consumption in the high-voltage network approaches the total amount of power available from the high-voltage network. Predetermined or predeterminable values for the ratio of the actual power demand in the high-voltage network and the total amount of power available from the high-voltage network side can be used. For example, when the actual power demand in the high-voltage network is 90% of the total power available from the high-voltage network side, the power of the at least one network component connected in the low-voltage network can already be reduced and/or the amount of power supplied to the at least one low-voltage network can be reduced.

It will be understood that advantageously at least one control device is provided on each of the high-voltage network side and the low-voltage network side to carry out the method, as will be described in more detail below.

Advantageously, a control device for controlling the network components and for determining the actual power consumption of the network is associated with each network, wherein the control device of the high-voltage network supplies information related to a power shortage in high-voltage network, while the high-voltage battery is being charged in the high-voltage network, to the control device of at least one low-voltage network, wherein the control device of the at least one low-voltage network reduces the power of at least one network component of the low-voltage network while additionally taking into consideration at least one boundary condition relating to the power consumption of at least one network component in the low-voltage network. The control devices associated with the respective networks are communicatively coupled to each other, i.e. they preferably communicate directly with one another to exchange at least information relating to the power shortfall in the high-voltage network. Accordingly, a power shortfall detected by a control device provided on the high-voltage network side and/or the amount of power required in the high-voltage network to compensate for the power shortfall can be quantitatively supplied to a control device of a low-voltage network in form of information relating to the power shortfall in the high-voltage network. The control device on the low-voltage network side then controls one or more network components on the low-voltage side such that their power is reduced accordingly, thereby allowing the control device of the high-voltage network to commensurately reduce the amount of power to be delivered to the low-voltage network.

Basically, the power of the at least one network component connected to the low-voltage network side is reduced by additionally considering at least one boundary condition relating to the power consumption of at least one network component of the low-voltage network. The boundary condition represents a list of rules based on which it can be determined, for example, how the power of the at least one network component connected to the at least one low-voltage network and the amount of power supplied from the high-voltage network to the at least one low-voltage network is at least partially reduced. Consequently, the control device of the respective low-voltage network determines independently based on the boundary conditions which network components can reduce their power consumption or be switched off and in which manner, i.e. which measures for power reduction are implemented in a given situation. The boundary conditions may be specified by a manufacturer and/or by a user.

In this context, the priorities assigned by the control device to the respective network components of the at least one low-voltage network may be used as a boundary condition. For example, it can be determined based on the priorities assigned to the respective network components connected to the low-voltage network side, in which order the power is reduced when several network components are connected to the low-voltage network side, and/or in which order network components connected to the low-voltage network side are switched off. It is also conceivable not to prioritize certain network components connected to the low-voltage network side, allowing these components to be supplied with electric power and thus operated. These may include, for example, safety-relevant components of the low-voltage power system, such as an alarm system or transmitting and/or receiving devices on the vehicle.

The prioritization occurs preferably as a function of a diminished comfort of one or more vehicle occupants due to the power reduction, wherein power to the network components associated with the greatest reduction in comfort is reduced last. Accordingly, the power reduction of the network components connected to the low-voltage network side is barely noticeable for the occupants of the vehicle. Comfort-relevant network components, which are thus switched off last, may for example be entertainment and/or information devices that provide the occupant(s) of the vehicle an entertainment and/or information service, or a seat heater. Consequently, the power is primarily reduced or switched off to network components whose operation cannot be immediately detected by the vehicle occupant(s).

Furthermore, a boundary condition may stipulate not to discharge at least one low-voltage battery connected to the at least one low-voltage network. The low-voltage battery thus always retains at least one defined or definable minimum charge state notwithstanding the reduced amount of power supplied to the low-voltage network.

For reducing power in at least one low-voltage network, the charging current to the at least one low-voltage battery connected to the at least one low-voltage network may be limited. For example, an electrical power of up to 1.5 kW could be supplied to a low-voltage battery unless the charging current is limited, so that power consumption of the at least one low-voltage network can be reduced by limiting the charging current of a low-voltage battery.

The amount of power available in the high-voltage network as a result of the reduction of the amount of power supplied to the at least one low-voltage network may be supplied, for example, to at least one cooling device associated with a high-voltage battery and connected as a network component in the high-voltage network. This addresses the aforedescribed overheating of the high-voltage battery during the charging process as a result of insufficient cooling by the cooling device. There is enough power available on the high-voltage network side to operate the cooling device, so that the high-voltage battery is adequately cooled during the charging process and is more particularly not damaged by overheating.

The invention also relates to a motor vehicle, with an onboard power supply system that includes at least two electrical systems having different supply voltages, wherein a high-voltage network supplies a specified amount of power to at least one low-voltage network, wherein at least one network component, in particular an electrical load, is connected in each system, and wherein the high-voltage network has at least one high-voltage battery connected to the high-voltage network. The vehicle is hereby configured to carry out the method according to the invention as described above.

Accordingly, potential power shortfalls in a high-voltage network can be compensated while charging at least one high-voltage battery connected in the high-voltage network by at least partially reducing the amount of power of the at least one network component connected to the at least one low-voltage network, and by at least partially reducing the amount of power supplied from the high-voltage network to the at least one low-voltage network.

The vehicle is preferably an electric motor vehicle or hybrid motor vehicle having an at least partially electric drive.

Advantageously, a control device for controlling the at least one network component and for determining the actual power consumption of the network is associated with each network. The control devices of the networks are configured for, in particular direct, communication therebetween, meaning they are configured to send and receive different information. Thus, the control devices are connected via at least one communication means.

BRIEF DESCRIPTION OF THE DRAWING

Further advantages, features and details of the invention will become apparent from the exemplary embodiments described hereinafter and with reference to the drawings, which show in.

DETAILED DESCRIPTION OF PREFERRED EMBODIMENTS

Figure 1:
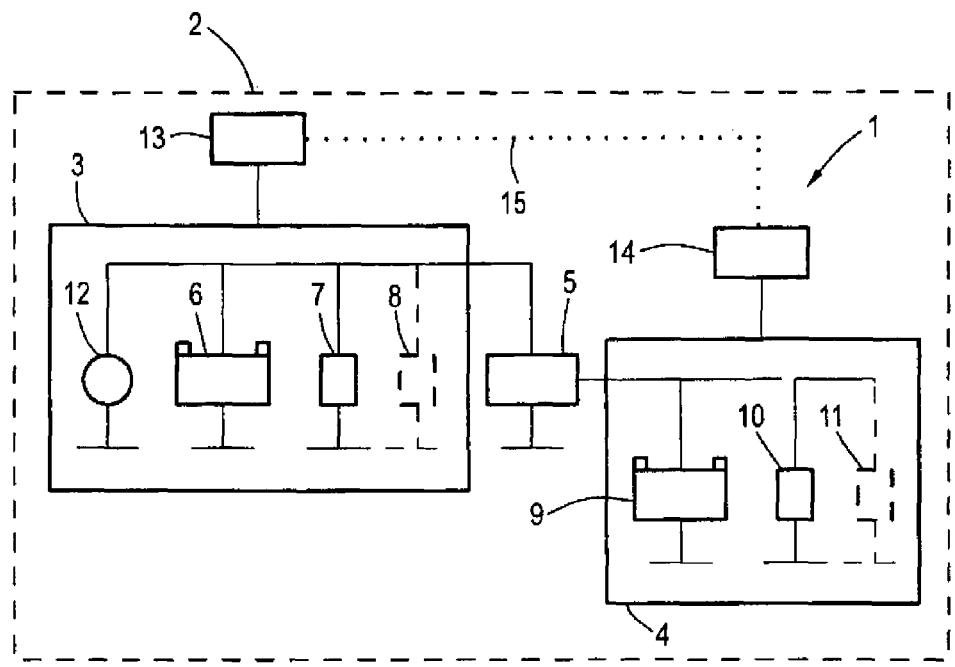
FIG. 1 a schematic diagram of an onboard power supply system of a motor vehicle according to the present invention, and FIG. 2 a schematic flow diagram of the method according to the present invention.

FIG. 1 shows a schematic diagram of an onboard power supply system 1 of a motor vehicle 2 according to the invention, in particular a motor vehicle constructed as an electric motor vehicle, wherein the motor vehicle 2 is indicated only by the dashed outline of the onboard power supply system 1. The onboard power supply system 1 includes two electrical networks 3, 4 with different network voltages, wherein a high-voltage network 3 has, for example, a supply voltage of 72 V and a low-voltage network 4 has, for example, a supply voltage of 12 V. The high-voltage network 3 supplies electrical energy to the low-voltage network 4 via a DC/DC converter 5, i.e. a specified amount of power of the total amount of power available in the high-voltage network 3 is delivered to the low-voltage network 4. Mutually different network components 6-11 are connected to both the high-voltage network and the low-voltage network. On the high-voltage network side, a high-voltage battery 6 and various electrical loads 7, 8 are provided, wherein the dashed illustration of the load 8 symbolizes that the load 8 may possibly represent a plurality of electrical loads. Likewise, a low-voltage battery 9 and corresponding loads 10, 11 are provided on the low-voltage network side, wherein the electrical load 11 is symbolized again by the dashed illustration which may optionally represent a plurality of electrical loads. A charging device 12 is also connected in the high-voltage network 3, so that the motor vehicle 2 is here in a parked state ready for charging, wherein the high-voltage battery 6 is charged via the charging device 12.

A control device 13, 14 is associated with both the high-voltage network 3 and the low-voltage network 4. The control device 13 of the high-voltage network 3 controls the operation and hence the power consumption of the network components 6-8 connected to high-voltage network side and additionally determines the actual power consumption of the high-voltage network 3. Accordingly, the controller 14 of the low-voltage network 4 controls the operation and thus the power consumption of the network components 9-11 connected to the low-voltage network side and determines the actual power consumption of the network components 9-11 connected to the low-voltage network side. The control devices 13, 14 are connected with each other for direct communication via a communication link 15.

The control device 13 of the high-voltage network 3 furthermore compares the total power available in the high-voltage network 3 with the actual power demand due to the operation of the network components 6-8 connected to the high-voltage network side in terms of a balance of the available power in the high-voltage power supply 3 supply and the actual power demand on the high-voltage network side. The amount of power provided by the high-voltage network 3 to the low-voltage network 4 via the DC/DC converter 5 is also taken into account.

Figure 2:
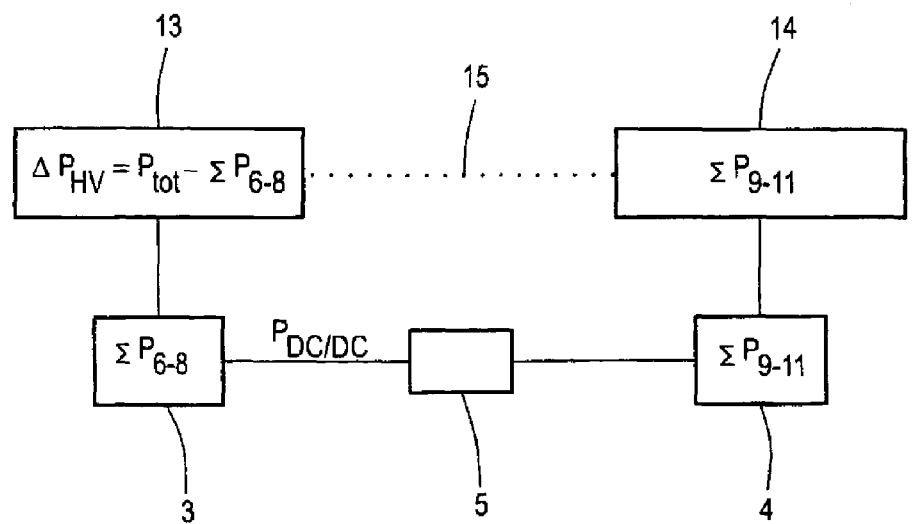

The basic process flow of the method according to the present invention will now be illustrated with reference to FIG. 2, using a concrete example. Starting with the charging process of the high-voltage battery 6 connected to the high-voltage network side via a charging device 12 connected to an (unillustrated) external power source, a total power $P_{tot}$ of for example 3 kW is available in the high-voltage network 3. The control device 13 on the high-voltage network side controller initially determines that an amount of power $P_{DC/DC}$ of 2 kW is supplied from the high-voltage network 3 via the DC/DC converter 5 to the low-voltage network 4 for operating the connected network components 10, 11 and/or for charging the low-voltage battery 9, leaving in the high-voltage network 3 only an amount of power of 1 kW for operating the connected network components 7, 8. When an amount of power of at least 2 kW is now requested, for example, for cooling the high-voltage battery 6 by way of a network component 7 in the form of a corresponding cooling device, the resulting power balance $\Delta P_{HV}$ in the high-voltage network 3 is now −1 kW, which is the difference between the total power $P_{tot}$ available on the high-voltage network side and the actually required power $SP_{6-9}$ on the high-voltage network side, i.e. a power shortfall of 1 kW exists on the high-voltage network side.

The power shortfall is detected by the control device 13 during the determination of the power balance $\Delta P_{HV}$ on the high-voltage network-side and information related to the power shortfall in the high-voltage network 3 is provided to the controller 14 of the low-voltage network 4 via the communication link 15, whereafter the controller 14 independently reduces at least partially the power in relevant network components 9-11, so that total power consumption $SP_{9-11}$ on the low-voltage network side is reduced by at least the amount of power of 1 kW needed in the high-voltage network 3. Likewise, the control device 13 of the high-voltage network 3 reduces the amount of power $P_{DC/DC}$ supplied to the low-voltage network 4 by the DC/DC converter 5 by 1 kW, so that the power balance in the high-voltage network 3 is no longer negative, but is now balanced. Sufficient power for operating the network components 7, 9 on the high-voltage network side is thus available in the high-voltage network 3, i.e. in particular for operating the cooling device associated with the high-voltage battery 6. Consequently, the amount of power made available on the high-voltage network side due to the reduction of the amount of power $P_{DC/DC}$ supplied to the low-voltage power 4 is supplied to the cooling device associated with the high-voltage battery 6 and connected in the high-voltage network 3 as a network component 7. It will be understood that the inventive principle applies equally to other, high-voltage network components 8 on the high-voltage network side, when these cannot be operated properly due to an acute power shortfall on the high-voltage network side.

The control device 14 on the low-voltage network side takes into consideration in the reduction of the power consumption $SP_{9-11}$ at least one boundary condition related to the power consumption of at least one network component 9-11 of the low-voltage network 4. Preferably, priorities assigned to the respective system elements 9-11 of the low-voltage network 4 are used by the control device 14 as a boundary condition. In this case, for example, the prioritization may be performed as a function of a reduction in comfort for one or more vehicle occupants of the motor vehicle 2 caused by the power reduction, wherein power to the network components 11 contributing to the greatest reduction in comfort is reduced last. Accordingly, the power to an entertainment and/or information device connected to the low-voltage network side may be reduced or switched off last, so that the total reduction in the power consumption $SP_{9-11}$ of the low-voltage network 4 carried out in the process of the invention is barely noticeable for the vehicle occupants. In addition, the charging current of the low-voltage battery 9 on the low-voltage network-side may be limited in order to reduce power in the low-voltage network 4, because a significant reduction in power consumption $SP_{9-11}$ of the low-voltage network 4 can be realized with this measure. All measures taken in the low-voltage network 4 to reduce the power consumption $SP_{9-11}$ can preferably also be done under the premise that the low-voltage battery 9 is not discharged.

After the high-voltage battery 6 has been fully charged, the original configuration of the original power consumption $SP_{9-11}$ of the low-voltage network-side network components 9-11 can in principle be reinstated. Excess power of 1 kW in the power balance of the high-voltage network 3 is produced by eliminating the power demand of the cooling device on the high-voltage network-side. The excess amount of power of 1 kW can then be supplied, unless otherwise usable in the high-voltage network 3, at least in part to the low-voltage network 4 via the DC/DC converter 5. The control device 14 of the low-voltage network 4 can then also send to the controller 13 of the high-voltage network 3 corresponding information relating to a power requirement in the low-voltage network 4 and/or request a specific power demand from the high-voltage network 3, whereafter the high-voltage network 3 supplies a corresponding additional amount of power to the low-voltage network, 4 when the high-voltage network has excess power available.

What is claimed is:

1. A method for operating an onboard power supply system of a motor vehicle, wherein the onboard power supply system comprises at least two electric networks with different supply voltages, wherein at least one network component, in particular an electrical load, is connected to each network, and at least one high-voltage battery is connected to the high-voltage network, the method comprising:
   supplying from a high-voltage network a specified amount of power to at least one low-voltage network, wherein the supply voltage of the at least one low-voltage network is lower than the supply voltage of the high-voltage network,
   reducing power of at least one network component connected in the at least one low-voltage network when a power shortfall occurs in the high-voltage network while the at least one high-voltage battery is being charged,
   reducing an amount of power supplied by the high-voltage network to the at least one low-voltage network of the at least one network component, and
   supplying an amount of power made available in the high-voltage network through reduction of the amount of power supplied to the at least one low-voltage network to at least one cooling device connected in the high-voltage network as a network component and associated with the at least one high-voltage battery outputting a supply voltage of at least 72 V.

2. The method of claim 1, comprising:
   associating a corresponding control device with each network for controlling the network components and for determining an actual power consumption of the network,
   sending with the control device of the high-voltage network information relating to the power shortfall in the high-voltage network to the control device of at least one low-voltage network, when a power shortfall occurs in the high-voltage network while the at least one high-voltage battery is being charged, and
   reducing with the control device of the at least one low-voltage network the power of at least one network component of the low-voltage network by additionally taking into account at least one boundary condition relating to a power consumption of at least one network component of the low-voltage network.

3. The method of claim 1, further comprising:
   using the supply voltage connected to the respective network components of the at least one low-voltage network by the control device of the at least one low-voltage network.

4. The method of claim 3, wherein the priorities are assigned based on a reduction in comfort for one or more vehicle occupants due to the reduction in power, and wherein the power is reduced last to those network components associated with the greatest reduction of comfort.

5. The method of claim 2, wherein at least one low-voltage battery connected to the at least one low-voltage network is not discharged.

6. The method of claim 1, further comprising limiting a charging current of at least one low-voltage battery connected in the at least one low-voltage network for reducing power in at least one low-voltage network.

7. A motor vehicle comprising:
   a onboard power supply system having at least two electrical networks which include a high-voltage network and at least one low-voltage network, with the high-voltage network and the at least one low-voltage network having different supply voltages,
   at least one network component, in particular an electric load, connected in each network,
   at least one high-voltage battery connected to the high-voltage network,
   wherein the motor vehicle is configured to operate the onboard power supply system by:
   supplying from the high-voltage network a specified amount of power to the at least one low-voltage network, wherein the supply voltage of the at least one low-voltage network is lower than the supply voltage of the high-voltage network,
   reducing power of at least one network component connected in the at least one low-voltage network when a power shortfall occurs in the high-voltage network while the at least one high-voltage battery is being charged,
   reducing an amount of power supplied by the high-voltage network to the at least one low-voltage network of the at least one network component and
   supplying an amount of power made available in the high-voltage network through reduction of the amount of power supplied to the at least one low-voltage network to at least one cooling device connected in the high-voltage network as a network component and associated with the at least one high-voltage battery outputting a supply voltage of at least 72 V.

8. The motor vehicle of claim 7, further comprising a control device associated with each network for controlling the at least one network component and for determining an actual power consumption of the network.

* * * * *